(12) United States Patent
Fehnel et al.

(10) Patent No.: US 6,599,991 B1
(45) Date of Patent: Jul. 29, 2003

(54) IN-SITU BLENDING OF POLYESTERS WITH POLY(ETHER IMIDE)

(75) Inventors: Robert H. Fehnel; Jehuda Greener, both of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/475,843

(22) Filed: Dec. 30, 1999

(51) Int. Cl.[7] .............................................. C08L 67/02
(52) U.S. Cl. ...................................... 525/425
(58) Field of Search ......................... 525/425

(56) References Cited

U.S. PATENT DOCUMENTS

| | | |
|---|---|---|
| 3,782,947 A | 1/1974 | Krall |
| 3,803,085 A | 4/1974 | Takehoshi et al. |
| 3,847,867 A | 11/1974 | Heath et al. |
| 3,905,942 A | 9/1975 | Takekoshi et al. |
| 4,011,198 A | 3/1977 | Takekoshi et al. |
| 4,141,735 A | 2/1979 | Schrader et al. |
| 4,141,927 A | 2/1979 | White et al. |
| 4,279,945 A | 7/1981 | Audran et al. |
| 4,293,684 A | 10/1981 | Takekoshi |
| 4,386,186 A | 5/1983 | Maresca et al. |
| 4,522,962 A | 6/1985 | Abbey et al. |
| 4,725,647 A | 2/1988 | Maresca et al. |
| 5,047,468 A | 9/1991 | Lee et al. |
| 5,126,398 A | 6/1992 | Lee et al. |
| 5,147,768 A | 9/1992 | Sakakibara |
| 5,149,738 A | 9/1992 | Lee et al. |
| 5,225,457 A | 7/1993 | Borowczak et al. |
| 5,252,441 A | 10/1993 | James et al. |
| 5,254,449 A | 10/1993 | James et al. |
| 5,281,669 A | * 1/1994 | Kambour ..................... 525/177 |
| 5,294,473 A | 3/1994 | Kawamoto |
| 5,368,997 A | 11/1994 | Kawamoto |
| 5,393,848 A | 2/1995 | Charbonneau et al. |
| 5,395,743 A | 3/1995 | Brick et al. |
| 5,397,826 A | 3/1995 | Wexler |
| 5,413,902 A | 5/1995 | Hara et al. |
| 5,427,900 A | 6/1995 | James et al. |
| 5,432,050 A | 7/1995 | James et al. |
| 5,434,037 A | 7/1995 | Wexler et al. |
| 5,436,120 A | 7/1995 | Wexler et al. |
| 5,457,018 A | 10/1995 | Sommer et al. |
| 5,498,651 A | * 3/1996 | Brunelle ..................... 524/176 |
| 5,599,658 A | 2/1997 | Greener et al. |
| 5,677,375 A | 10/1997 | Rifi et al. |

FOREIGN PATENT DOCUMENTS

| | | |
|---|---|---|
| EP | 0 135 168 A2 | 3/1985 |
| EP | 0 930 531 A1 | 7/1999 |

OTHER PUBLICATIONS

Research Disclosure, vol. 283, Nov. 10, 1987, Item 28338, pp. 677–'678.
Research Disclosure, vol. 343, Nov. 10, 1992, Item 34390, pp. 869 et seq.
Research Disclosure, vol. 370, Feb. 10, 1995, Item 37038, pp. 79–114.

* cited by examiner

*Primary Examiner*—Patricia Short
(74) *Attorney, Agent, or Firm*—Doreen M. Wells

(57) ABSTRACT

A method for blending poly(ether imide)s with polyesters comprising: (a) adding polyester monomers and poly(ether imide) in a polymerization reactor at any point during a polyester polymerization process; and (b) polymerizing the polyester monomers in the presence of the poly(ether imide) under standard conditions to produce a blend.

19 Claims, No Drawings

IN-SITU BLENDING OF POLYESTERS WITH POLY(ETHER IMIDE)

FIELD OF THE INVENTION

This invention relates to a general method for preparing homogeneous blends of poly(ethylene naphthalate) and other polyesters with poly(ether imide)s.

BACKGROUND OF THE INVENTION

A novel blend of poly(ethylene naphthalate) (PEN) with poly(ether imide) (PEI) was disclosed in U.S. Pat. No. 5,599,658 as a resin formulation with a number of useful properties which makes it especially advantageous for use in photographic film. In particular, a film manufactured from this blend at a certain composition range generally retains the desirable properties of PEN film, while having a lower propensity to take up core-set curl. This property permits its use in small diameter cartridges—for example, diameters in the range of –12.5 mm—without suffering the consequence of an increased curl in the wound film. It is also possible to use less extreme annealing conditions (lower annealing temperature and/or shorter annealing time) with a film comprising the said blend formulation to achieve equivalent core-set propensity to that of PEN film.

However, preparation of the blend formulation in accordance with U.S. Pat. No. 5,599,658, the contents of which are incorporated herein in their entirety, requires thorough drying of all components and an additional compounding step using, typically, a twin-screw extruder or equivalent melt compounding equipment. These additional steps raise the cost of the blend and make it less attractive economically compared to the unblended PEN resin. In addition, the need to heat the resin components to high temperature during compounding can lead to thermal and hydrolytic degradation as well as contamination of the blended resin with debris from the compounding equipment.

What is needed in the art is a method of preparing a blend of poly(ether imide) (PEI) with poly(ethylene naphthalate) (PEN), poly(ethylene terephthalate) (PET) and other polyesters that overcomes the problems noted above.

SUMMARY OF THE INVENTION

The present invention discloses an in-situ process of blending PEI and polyesters that provides better control of the blended polymer viscosity and avoids problems heretofore encountered in the blending process.

The conventional, high temperature compounding step can be eliminated by adding the PEI resin directly into the reactor used for preparing the PEN polymer. The invention discloses that, contrary to expectation, the presence of PEI pellets in the polyester polymerization reaction vessel has no adverse effect on the kinetics and extent of the polymerization reaction and allows easy blending and homogenizing of the added PEI resin with the polymerizing PEN species. The final resin obtained by this "in-situ" blending process is a homogeneously dispersed PEN/PEI blend with a sufficiently high inherent viscosity (IV) and a single glass transition temperature (Tg).

DETAILED DESCRIPTION OF THE INVENTION

Poly(ethylene naphthalene), sometimes abbreviated as PEN, previously has been used as a support for magnetic recording and playback tapes and had been proposed for use as a support for photographic film, for example in U.S. Pat. No. 4,141,735, U.S. Pat. No. 5,294,473 and U.S. Pat. No. 5,368,997. The '473 and '997 patents broadly describe copolyesters with PEN and blends of PEN with other polymers, but not with a poly(ether imide). The PEN used in the polymer blend of this invention can be the same polymer as described in this prior art, such as U.S. Pat. No. 5,368,997, the disclosure of which is incorporated herein by reference. Preferably it is PEN, particularly poly(ethylene-2,6-naphthalate).

The PEN used in the polymer blends of this invention preferably has molecular weights represented by inherent viscosities in the range of 0.5 to 0.9 dl/g. (Inherent viscosity is measured in a Ubbelhode capillary viscometer (Shott Gerate 536-13) at 25° C. and at a polymer concentration of 0.25 g/dL in a 50/50 mixture by weight of pentafluorophenol and 1,2,4-trichlorobenzene.) The PEN used in the polymer blends of this invention preferably has a glass transition temperature (Tg), above about 118° C.

Poly(ether imide), sometimes abbreviated as PEI, is the condensation product of a bis(etherdianhydride) and an organic diamine. Its synthesis, structure and use are described in U.S. Pat. Nos. 3,803,085, 3,847,867, 3,905,942, 4,011,198 and 4,293,684. The particular PEI used in the polymer blends of this invention can be as described in this prior art, such as U.S. Pat. No. 3,847,867, the disclosure of which is incorporated herein by reference. A preferred PEI is one in which the bis(etherdianhydride) is 2,2-bis[4-(2,3-dicarboxyphenoxy)phenyl]propane dianhydride (also known as Bisphenol A dianhydride) and the organic diamine is m-phenylene diamine.

Preferably, the PEI has a molecular weight represented by a melt viscosity in the range of $10^3$ to $10^5$ poise. Melt viscosity is measured according to the following procedure: A sample of the PEI in pellet form is dried under vacuum at 150° C. for 10 hrs. The dried sample is loaded into a parallel disk (25 mm diameter) fixture of a Rheometrics System IV® rheometer (manufactured by Rheometrics, Inc., Possumtown Rd., Piscataway, N.J. 08854) and its temperature is raised to 305° C. The viscosity of the melt is determined by shearing the resin at a constant oscillating frequency of 1 rad/s.

The PEI used in this invention preferably has a glass transition temperature (Tg) which is above 150° C. In addition, the PEI should be miscible with the PEN. By miscible is meant that the blend of the two polymers has a single glass transition temperature (Tg) and that a photographic film base made from the blend is clear. The PEI is available commercially from the General Electric Company, One Plastics Ave., Pittsfield, Mass. 01201, under the Ultem® trade name. Representative grades are Ultem 1000® and Ultem 1010®.

Blending of PEI with polyesters, such as PET and PEN is broadly described in U.S. Pat. No. 4,141,927 and *Research Disclosure*, November 1987, Item 28338, pages 677–8. (*Research Disclosure* is published by Kenneth Mason Publications, Ltd., Dudley Annex, 12a North Street, Emsworth, Hampshire P010 7DQ, ENGLAND.) These patents and publication do not describe the blends of this invention or suggest that they would be suitable for use as a photographic film base. Nor does any of this art suggest that blending PEI with PEN would have any influence on the core-set and post-process curl characteristics of a film based prepared from the blend, let alone suggest that such a blend would provide a film base in which these characteristics were improved.

The blends of this invention preferably have the following physical characteristics: a Tg of greater than 125° C.; a tensile modulus greater than 350 Kg/mm$^2$; light transmission greater than 80%; and haze less than 3%. The way in which these characteristics are determined is described in the Examples in U.S. Pat. No. 5,599,658.

While the relative proportions of PEN and PEI may vary somewhat with variations in the particular PEI employed, as well as with the presence of other components in the blend, preferred proportions of PEN and PEI in the blends of this invention are from 70 to 95 weight percent PEN and from 5 to 30 weight percent of PEI. When the proportion of PEI is increased, we have found that the tensile modulus is decreased, the crystallinity of the blend is lowered and a sheet formed from the blend becomes difficult to stretch. When the proportion of PEI is decreased below the said range, we have found that the improvement in physical performance of the blend becomes insignificant. Preferably the proportion of PEI is between 10 and 20 percent by weight. Most preferably the proportion of PEI is between 12 and 17 percent by weight. These are the preferred proportions for PEI prepared from bisphenol A dianhydride and m-phenylene diamine.

Film base is prepared from the polymer blend by techniques known to those skilled in the art. These techniques are described in detail in Schrader U.S. Pat. No. 4,141,735, the disclosure of which is incorporated herein by reference. A film base is understood to be a planar sheet having a thickness in the range of 50 to 200 µm, preferably a thickness of 70 to 110 µm.

In a typical operation, the film base is formed by extruding the polymer blend at a temperature of 290 to 320° C. through a sheeting die and casting the molten sheet on a chill roll at a temperature of 60 to 120° C. The cast sheet is then stretched biaxially to from 2 to 5 times its initial lateral dimensions. tretching can be at a temperature in the range of from 130 to 170° C. Biaxial stretching can be sequential or simultaneous. After stretching the film base is heatset at a temperature in the range of 200 to 250° C. for time in the range of 0.1 to 10 sec. If the film base is to be annealed, it can be annealed at a temperature in the range of from 50° C. up to the Tg of the polymer blend for a time in the range of 0.1 to 1000 hours. Film base with core-set characteristics useful for small diameter film cartridges can be obtained with preferred blends of this invention by annealing at temperatures of between about 90 and 125 ° C. for times of 6 to 72 hrs.

Film base prepared from polymer blends of this invention can contain other components commonly found in film supports for photographic elements. These include dyes, lubricants and particles of organic and inorganic materials such as glass beads. These are described in more detail in *Research Disclosure*, February 1995, Item 37038, pages 79–114.

Film base prepared from polymer blends of this invention can bear layers commonly found on film supports used for photographic elements. These include magnetic recording layers, subbing layers between other layers and the support, photosensitive layers, interlayers and overcoat layers, as are commonly found in photographic elements. These layers can be applied by techniques known in the art and described in the references cited in Research Disclosure Item 37038 cited above.

Magnetic recording layers that can be used in photographic elements of this invention are described in U.S. Pat. Nos. 3,782,947; 4,279,945; 5,147,768; 5,252,441; 5,254, 449; 5,395,743; 5,397,826; 5,413,902; 5,427,900, 5,432, 050, 5,434,037, 5,436,120, in *Research Disclosure* November 1992, Item 34390, pages 869 et seq.

Photographic elements of this invention can have the structures and components shown on *Research Disclosure* 37038 cited above and can be imagewise exposed and processed using known techniques and compositions, including those described in the *Research Disclosure* Item 37038 cited above.

Blending of PEI with polyesters, such as PET and PEN, is broadly described in U.S. Pat. No. 4,141,927 and Research Disclosure, November 1987, Item 28338, pages 677–8 (Research Disclosure is published by Kenneth Mason Publications, Ltd., Dudley Annex, 12a North Street, Emsworth, Hampshire P010 7DQ, UK). Both of these publications cite examples of a melt or a solution blending process for the PEI and polyester components. However, they do not describe nor do they suggest the possibility of an "in-situ" blending process such as is claimed in the present invention. In-situ blending has been applied in previous inventions to the preparation of blends of mostly addition-type polymers, e.g., various polyolefins (U.S. Pat. Nos. 5,225,457; 5,126,398; 5,149,738; 5,047,468; 5,677,375 and 4,522,962) and styrenics (E.P. No. 135,168). The polymers of the present invention, polyesters, are produced by a condensation-type polymerization process, which is fundamentally different from the addition process used for preparing polyolefins and styrenics or from the condensation process of other polymers. The general procedure of the polyester polymerization process is well known to those skilled in the art. Suitable polyesters for this invention are any that are manufactured by a polycondensation process at temperatures greater than the glass transition temperature of the poly(ether imide). Some examples of such polyesters and copolyesters include polycondensation products of diacid (or diester analogs) and glycols such as terephthalic acid, naphthoic acid, 5-sodiosulfoisophthalic acid, isophthalic acid, ethlylene glycol, diethylene glycol, poly (ethylene glycol), poly(propylene glycol), cyclohexane dimethanol, butanediol, neopentyl glycol, trimethylol propane and pentaerythritol. The weight ratio of polyester:poly (ether imide) in the blend is 95:5 to 70:30, preferably 80:20 to 90:10. The poly(ether imide) may be added to a continuous polymerization reactor or a batch polymerization reactor. In one embodiment of the invention the polyester is poly(ethylene-2,6-naphthalate). In another embodiment the poly(ether imide) is a condensation polymer of 2,2-bis[4-(2,3-dicarboxyphenoxy)phenyl] propane dianhydride and m-phenylene diamine. The weight ratio of poly(ethylene-2, 6-naphthalate):the condensation polymer of 2,2-bis[4-(2,3-dicarboxyphenoxy)phenyl] propane dianhydride and m-phenylene diamine in the blend is 80:20 to 90:10.

In yet another embodiment, the polyester is poly(ethylene terephthalate). The weight ratio of poly(ethylene terephthalate):poly(ether imide) in the blend is 95:5 to 70:30. A preferred poly(ether imide) is the condensation polymer of 2,2-bis[4-(2,3-dicarboxyphenoxy)phenyl] propane dianhydride and m-phenylene diamine. The weight ratio of poly(ethylene terephthalate):the condensation polymer of 2,2-bis[4-(2,3-dicarboxyphenoxy)phenyl] propane dianhydride and m-phenylene diamine in the blend is 95:5 to 70:30, preferably 80:20 to 90:10.

The method of the invention is useful to prepare a blend for film supports in photographic elements. An exemplary photographic element may comprise a film support bearing at least one photographic layer, the film support comprising a homogenous blend of from 70 to 95 weight percent poly(ethylene naphthalate) and from 30 to 5 weight percent of a poly(ether imide), preferably 80 to 90 weight percent poly(ethylene naphthalate) and from 20 to 10 weight percent of a poly(ether imide).

The following examples further illustrate this invention.

EXAMPLE 1

15% PEI in PEN Using in-situ Blending 100.778 g of 2,6-dimethyl naphthalene dicarboxylate is added to a 500 ml, 3 neck, round bottom flask. 51.220 g ethylene glycol, 0.025 g manganese acetate dihydrate and 0.027 g antimony trioxide are also added to the flask. The flask is fitted with a stirrer, distillation head and condenser. The flask is immersed in a 190° C. bath. The bath temperature is held at 190° C. for 1 hour and then ramped to 250° C. at 0.4° C./min. Methanol begins to distill over after the flask has been in the bath for about 17 minutes. The 26.4 g theoretical amount of methanol is removed by the time the bath temperature reaches 250° C. The mixture is held in the 250° C. bath for 1 hour. 17.6 g of Ultem 1000® poly(ether imide) (PEI) which has been dried for 24 hours in a 150° C., 20 mm Hg vacuum oven is added to the mixture in the flask. Some foaming is seen as residual moisture in the PEI boils off. About 7 minutes after the PEI addition a ramp is begun to 310° C. at 1° C./min. At a bath temperature of 260° C., the distillation head is removed and a sidearm to vacuum is installed on the flask. Vacuum is applied from a water aspirator for 10 minutes. Then mechanical pump vacuum to 1 mm Hg is applied. After 45 minutes on pump vacuum, the vacuum is relieved with nitrogen. The 15 weight percent PEI in PEN mixture has a PEN equivalent weight average molecular weight in 20:80::dichloroacetic acid:dichloromethane of 41,100 and an inherent viscosity in 50:50::pentafluorophenol:trichlorobenzene of 0.668 dl/g. The second heat of differential scanning calorimetry at 10° C./min shows a single Tg of 129° C., a single onset of crystallization of 214° C. and a single onset of melting of 251° C. Another laboratory synthesis yielded a single Tg of 133° C., a single onset of crystallization of 222° C. and an onset of melting of 258° C. The Tg of Ultem 1000® is about 217° C., and the Tg of PEN is about 120° C.

EXAMPLE 2 (Comparative)

15% PEI in PEN Blended in a Twin Screw Extruder

PEN and Ultem 1000® pellets are blended in a twin screw extruder and pelletized. The second heat of differential scanning calorimetry at 10° C./min shows a single Tg of 131° C., a single onset of crystallization of 214° C. and a single onset of melting of 254° C.

EXAMPLE 3

15% PEI in PET Using in-situ Blending 85.832 g dimethyl terephthalate is added to a 500 ml, 3 neck, round bottom flask. 49.383 g ethylene glycol, 0.022 g zinc acetate dihydrate and 0.034 g antimony trioxide are also added to the flask. The flask is fitted with a stirrer, distillation head and condenser. The flask is immersed in a 190° C. bath. The bath temperature is held at 190° C. for 2 hours and then ramped to 250° C. at 0.83° C./min. Methanol begins to distill over after the flask has been in the bath for about 9 minutes. The 28.3 g theoretical amount of methanol is removed by the time the bath temperature reaches 250° C. The mixture is held in the 250° C. bath for 1 hour. 15 g of Ultem 1000® poly(ether imide) (PEI) which has been dried for 24 hours in a 150° C., 20 mm Hg vacuum oven is added to the mixture in the flask. Some foaming is seen as residual moisture in the PEI boils off. About 7 minutes after the PEI addition a ramp is begun to 295° C. at 1.5° C./min. At a bath temperature of 260° C., the distillation head is removed and a sidearm to vacuum is installed on the flask. Vacuum is applied from a water aspirator for 10 minutes. Then mechanical pump vacuum to 1 mm Hg is applied. After 36 minutes on pump vacuum, the vacuum is relieved with nitrogen. The 15 weight percent PEI in PET mixture has a PET equivalent weight average molecular weight in 20:80::dichloroacetic acid:dichloromethane of 38,100 and an inherent viscosity in 60:40::phenol:chlorobenzene of 0.598 dl/g. The second heat of differential scanning calorimetry at 10° C./min shows a single Tg of 89° C., a single onset of crystallization of 162° C. and a single onset of melting of 238° C. The Tg of PET is about 76° C.

The invention has been described in detail with particular reference to certain preferred embodiments thereof, but it will be understood that variations and modifications can be effected within the spirit and scope of the invention.

What is claimed is:

1. A method for blending poly(ether imide)s with polyesters or copolyesters comprising:
   (a) adding polyester monomers and poly(ether imide) in a polymerization reactor at any point during a polyester condensation polymerization process; and
   (b) polymerizing the polyester monomers in the presence of the poly(ether imide) under standard condensation polymerization conditions to produce a blend;
   wherein the poly(ether imide)s and the polyesters are linear or branched;
   wherein the polyester or copolyester is selected from the group consisting of polycondensation products of monomers consisting of diacids, diester analogs and glycols; and
   wherein the glycol is ethlylene glycol, diethylene glycol, poly(ethylene glycol), poly(propylene glycol), cyclohexane dimethanol, butanediol, neopentyl glycol, trimethylolpropane or pentaerythritol.

2. The method of claim 1 wherein the weight ratio of polyester:poly(ether imide) in the blend is 95:5 to 70:30.

3. The method of claim 1 wherein the weight ratio of polyester:poly(ether imide) in the blend is 80:20 to 90:10.

4. The method of claim 1 wherein the poly(ether imide) is added to a continuous polymerization reactor or a batch polymerization reactor.

5. The method of claim 1 wherein the polyester is poly(ethylene-2,6-naphthalate).

6. The method of claim 5 wherein the weight ratio of poly(ethylene naphthalate):poly(ether imide) in the blend is 95:5 to 70:30.

7. The method of claim 5 wherein the weight ratio of poly(ethylene naphthalate):poly(ether imide) in the blend is 80:20 to 90:10.

8. The method of claim 5 wherein the weight ratio of poly(ethylene-2,6-naphthalate):a condensation polymer of 2,2-bis[4-(2,3-dicarboxyphenoxy)phenyl] propane dianhydride and m-phenylene diamine in the blend is 80:20 to 90:10.

9. The method of claim 5 wherein the weight ratio of poly(ethylene-2,6-naphthalate):a condensation polymer of 2,2-bis[4-(2,3-dicarboxyphenoxy)phenyl] propane dianhydride and m-phenylene diamine in the blend is 95:5 to 70:30.

10. The method of claim 1 wherein the poly(ether imide) is a condensation polymer of 2,2-bis[4-(2,3-dicarboxyphenoxy)phenyl] propane dianhydride and m-phenylene diamine.

11. The method of claim 1 wherein the polyester is poly(ethylene terephthalate).

12. The method of claim 11 wherein the weight ratio of poly(ethylene terephthalate):poly(ether imide) in the blend is 95:5 to 70:30.

13. The method of claim 11 wherein the weight ratio of is poly(ethylene terephthalate):poly(ether imide) in the blend is 80:20 to 90:10.

14. The method of claim 11 wherein the poly(ether imide) is a condensation polymer of 2,2-bis[4-(2,3-dicarboxyphenoxy)phenyl] propane dianhydride and m-phenylene diamine.

15. The method of claim 11 wherein the weight ratio of poly(ethylene terephthalate):a condensation polymer of 2,2-bis[4-(2,3-dicarboxyphenoxy)phenyl] propane dianhydride and m-phenylene diamine in the blend is 95:5 to 70:30.

16. The method of claim 1 wherein the polyester or copolyester is selected from the group consisting of polycondensation products of diacids, diester analogs and glycols.

17. The method of claim 16 wherein the diacid is terephthalic acid, naphthoic acid, 5-sodiosulfoisophthalic acid, or isophthalic acid or their diester analogs.

18. The method of claim 16 wherein the glycol is ethylene glycol, diethylene glycol, poly(ethylene glycol), poly(propylene glycol), cyclohexane dimethanol, butanediol, neopentyl glycol, trimethylolpropane or pentaerythritol.

19. A method for blending poly(ether imide)s with polyesters or copolyesters comprising:

(a) adding polyester monomers and poly(ether imide) in a polymerization reactor at any point during a polyester condensation polymerization process; and (b) polymerizing the polyester monomers in the presence of the poly(ether imide) under standard condensation polymerization conditions to produce a blend;

wherein the poly(ether imide)s and the polyesters are linear or branched;

wherein the polyester or copolyester is selected from the group consisting of polycondensation products of monomers consisting of diacids, diester analogs and glycols, and wherein the diacid is terephthalic acid, naphthoic acid, isophthalic acid, sodiosulfoisophthalic acid or their diester analogs.

* * * * *